Jan. 10, 1967   R. G. QUAST   3,296,687
VALVE SERVICING MACHINE

Filed Aug. 3, 1964   2 Sheets-Sheet 1

INVENTOR.
RAY G. QUAST
BY [signature]

AGENT

Jan. 10, 1967    R. G. QUAST    3,296,687
VALVE SERVICING MACHINE
Filed Aug. 3, 1964    2 Sheets-Sheet 2
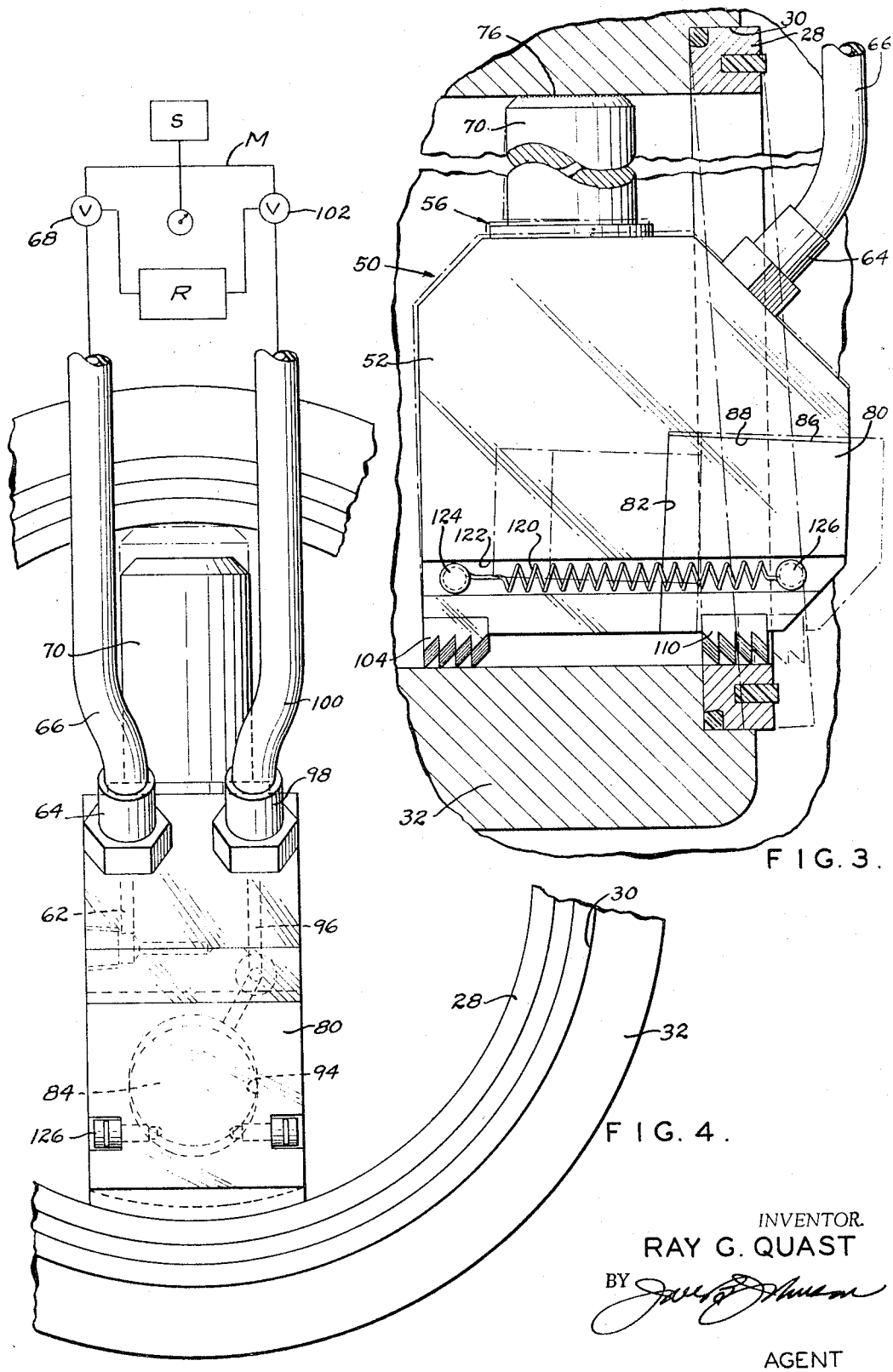
FIG. 3.
FIG. 4.
INVENTOR.
RAY G. QUAST
AGENT 3,296,687
VALVE SERVICING MACHINE
Ray G. Quast, Houston, Tex., assignor to ACF Industries, Incorporated, New York, N.Y., a corporation of New Jersey
Filed Aug. 3, 1964, Ser. No. 386,995
9 Claims. (Cl. 29—213)

This invention relates generally to the servicing of valves and more specifically to a machine for extracting press-fitted seats from the seat recesses of a valve.

Valves for controlling flow of fluids in fluid processing industries or fluid transportation industires have long presented costly production problems when repair of the valves becomes necessary because of leakage due to seat wear or packing wear. In processing industries, such as petroleum refineries, it frequently becomes necessary to shut down a complete unit of the refinery merely to replace or to repair a leaking valve. This involves considerable production losses occasioned by the costs of shutting down the equipment and restarting the process as well as production losses due to down time.

A number of very large high-speed pipelines, for example, pipelines having 20 to 30 inch flow passages, have been installed for transporting crude oil, natural gas, etc., from one locality to another. These large pipelines can transport fluid at the rate of several thousand barrels per hour. Down time for repairs on pipelines of this type can become extremely costly because of the production losses involved.

The two general types of valve repair are overhaul repair, where the valve is completely removed from the line for the repair operation, and field repair, where the valve is repaired in place. Overhaul repair generally involves complete rebuilding of the valve while field repair involves replacement of worn parts only. When overhauling a valve, generally the valve to be repaired will be removed from the line and a replacement valve will be installed in its place so that the line may be put back into service. The valve needing repair will then be shipped either to a valve repair center or shipped to the factory of its manufacture for complete rebuilding by specially trained valve repair personnel. A number of problems occur when the valve must be removed from the line for repair. The valve, especially if it is a large valve will frequently be welded in place in the line, and, therefore, must be cut out of the line and a new valve welded in its place in order to put the line back in service. When the line is utilized for the transportation of flammable fluids such as crude oil, natural gas, gasoline, and the like, the use of flame to cut the valve out of the line, such as would be produced by an oxyacetylene cutting torch, can be extremely hazardous and requires the use of special equipment, personnel and techniques. Other problems occur when the valve to be repaired is located in a relatively inaccessible area because of the special equipment generally needed for replacement repair. If the valve is positioned beneath the surface of the ground, which is frequently the case in large transportation valves, special equipment must be moved to the valve site to aid in uncovering the valve and removing the valve once it is separated from the line.

The second type of valve repair, generally known as field repair, is accomplished whenever possible to reduce down time on the line and to limit production losses. Field repair, such as replacement of the valve stem packings and replacement or repair of the valve seats, gate or bonnet structure, is frequently accomplished while the valve is positioned in the line. Field repair is not generally critical and can be scheduled during periods when the line is down for other reasons. Field repair involving the removal and replacement of press-fitted seat assemblies in valves requires that the valve be opened such as by removing the bonnet assembly from the valve to give access to the seats. The press-fitted seats can then be removed from their respective seat recesses. Due to manufacturing tolerances, most seats have an extremely tight press-fit with the seat recess thereby requiring considerable effort to remove the same. In the past press-fitted seats have been removed by hitting the rear portion of the seat with a hammer and chisel or other driving tool to drive the seats out of their seat recesses. Because of the tight press-fit, a valve repairman using driving tools such as a hammer and chisel to remove the seats may work for an hour or more before driving a single seat out of its recess. Another disadvantage is that the valve repairman, when repairing a large valve, must lean or reach downwardly into the valve cavity for access to the seats. When the line has been used for flammable fluids such as gasoline or crude oil or for transporting toxic ladings, this type of service becomes hazardous because of the fumes present and because of the danger to the repairmen in case of explosion which might be caused by striking sparks.

It is, therefore, a primary object of this invention to provide a novel machine for extracting press-fitted seats from a valve which eliminates the need for the operator to be subjected to fumes from the lading for extended lengths of time.

It is a further object of this invention to provide a novel machine for removing press-fitted seats from the valve which is effective in operation and which will not damage either the seat which is removed or the seat recess.

An even further object of this invention contemplates the provision of a novel machine for removing press-fitted seats from the valve which is lightweight, portable, and which can be effectively operated by a single repairman.

It is an even further object of this invention to provide a novel machine for removing press-fitted seats from a valve which is adjustable to different valve sizes.

It is an even further object of this invention to provide a novel machine for removing press-fitted seats from a valve which is economical in manufacture and reliable in use.

Other and further objects of this invention will be obvious upon an understanding of the illustrative embodiments about to be described, or will be indicated in the appended claims, and various advantages not referred to herein will occur to one skilled in the art upon employment of the invention in practice. Preferred embodiments of the invention have been chosen for the purpose of illustration and description and are shown in the accompanying drawings forming a part of the specification, wherein;

FIGURE 3 is a partial elevational view of the valve of FIGURE 1 in section illustrating positioning and operation of the invention.

FIGURE 4 is a partial right side elevational view of the machine of FIGURE 1 illustrating positioning of the machine in the valve passage.

Briefly, the invention concerns a machine which is adapted to be positioned within the flow passage of a valve with portions thereof engaging the valve bore and another portion thereof engaging the valve seat. Upon energization of a locking portion of the machine by pressurized fluid, for example, the machine becomes locked within the valve bore and upon selective energization of a movable portion of the machine, the valve seat will be forced from its recess.

Figure 1:
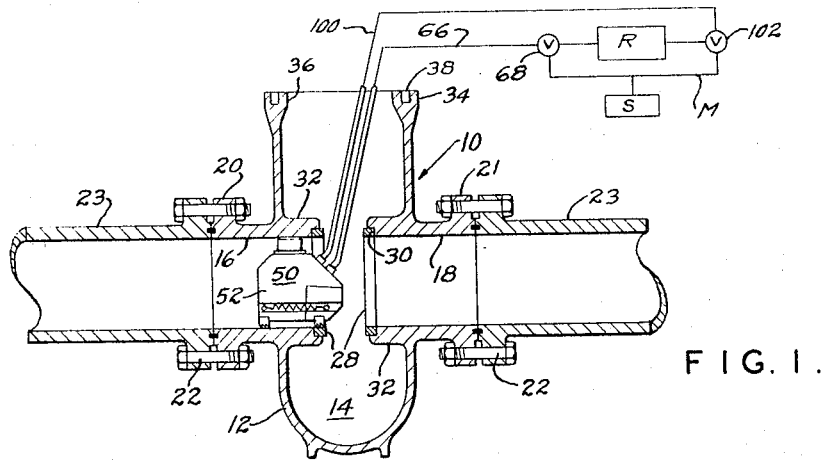
FIGURE 1 is an elevational view of a valve body having its bonnet assembly removed and having a machine in accordance with the invention in operative position within the flow passage thereof.

Referring now to the drawings for a better understanding of the invention, a valve 10 is illustrated in FIGURE 1, which comprises a valve body 12 formed with a valve chamber 14 and having flow passages 16 and 18 in communication with the valve chamber 14. Flanges 20 and 21 are formed integral with the valve body 12 and receive bolts 22 for bolting the valve into a flanged pipeline 23. The valve may be connected to a pipe system by any other well-known connection structure such as welded or threaded connections for example, without departing from the spirit or scope of this invention. A pair of identical seat assemblies 28 are press-fitted into seat recesses 30 formed in annular bosses 32 which extend into the valve chamber 14.

An annular flange portion 32 formed integrally with the valve body 12 defines an opening 36 and an annular bolt circle 38 for receiving a bonnet assembly and gate assembly, not shown.

Figure 2:
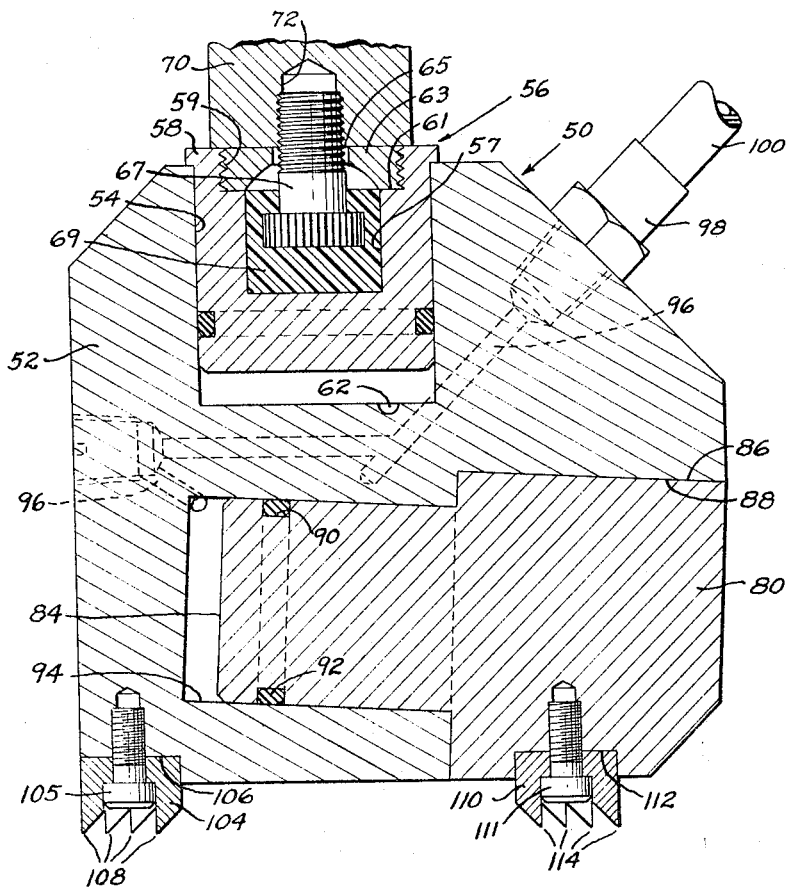
FIGURE 2 is a sectional view of the machine of FIGURE 1, illustrating the invention in greater detail.

In accordance with the invention, a seat extracting machine 50 is provided for removing the valve seats 28 from their recesses 30, as illustrated in FIGURE 2. The seat extracting machine 50 comprises a power head 52 of such a size that it can be placed within the flow passage of a valve. The power head 52 is formed with a cylindrical bore 54 having a piston 56 disposed therein. The piston 56 is provided with a stop flange 58 to limit the entry of the piston into the bore 54 and has an annular groove 58 formed therein which retains an O-ring type elastomer sealing member to establish sealing engagement between the piston 56 and the cylindrical wall of the bore 54.

The piston 56 is also formed with an internal bore 57 defining a chamber and an enlarged threaded bore 59 defining an annular support shoulder 61 at the outer extremity of the bore 57. A locking ring 63 is threaded into the bore 59 in tight engagement with the support shoulder 61 and has a central aperture 65 arranged coaxially with the bores 57 and 59. A threaded bolt 67 is positioned within the bore 57 and has its threaded end extending through the aperture 65 in the lock nut 63. The bore 57 is filled with a relatively resilient material 69, such as rubber or various resilient plastics, which encases the head portion of the bolt 67 to retain the bolt in a central position within the bore 57. The aperture 65 is larger than the diameter of the bolt 58 allowing limited lateral movement of the threaded portion of the bolt so that the bolt has universal movement relative to the piston 56. A replaceable locking bar 70, having a threaded bore 72 therein, is adapted to be received by the threads of the bolt 67 to form an extension of the piston 56. As illustrated in FIGURE 4, the locking bar 70 is extended by the piston 56 into engagement with the flow passage wall to lock the machine within the flow passage of the valve body as discussed hereinbelow.

A fluid passage 62 is formed in the power head 52 and communicates the interior extremity of the cylinder 54 with an external fitting 64. A conduit 66 is connected at one end thereof to the external fitting 64 and serves to conduct pressurized fluid such as pressurized hydraulic fluid or compressed air from the manifold M of a fluid source S to the cylinder 54, as illustrated schematically in FIGURE 4. A valve 68 is provided in the conduit 66 for selectively controlling the flow of pressurized fluid into the cylinder 54 from the manifold M, as desired. The valve 68 is a three-way type control valve of a well-known commercially available type and having a closed position blocking the flow of fluid through the conduit 66, an open position allowing the flow of fluid therethrough and a dump position blocking the flow of fluid from the source S but allowing the fluid within the conduit 66 to be vented to the atmosphere or to a fluid reservoir R schematically illustrated in FIGURE 4. Any one of numerous commercially available control valves may be employed without departing from the spirit or scope of this invention.

The invention is adapted for use with different size valves through the use of a series of replaceable locking bars of various lengths. A locking bar will be provided for each valve size to adapt the machine for use in all valves above the minimum size for which the machine is designed. Each of the locking bars 70 is formed with a frusto-conical portion on one extremity thereof defining a small serrated valve bore engaging surface 76, which is adapted to engage the flow passage to prevent slipping between the locking bar 70 and the flow passage 18. The piston 56, when energized by fluid from the source S under control of the valve 68, will move outwardly of its cylinder 54 and force the serrated surface 76 of the replaceable locking bar 70 into tight engagement with the wall defining the flow passage 16 of the valve 10.

As illustrated in detail in FIGURES 2, 3 and 4, a pushing block 80 is disposed within a recess 82 formed in the power head 52 and is energized by an integral piston 84 to move in a direction generally axially of the flow passage 16. The pushing block 80 is formed with a cam surface 86 which mates with a cam surface 88 formed on the pushing block 52 to cause slight transverse movement of the pushing block 80 upon being moved longitudinally by the piston 84. The piston 84 is provided with an annular recess 90 which receives an annular resilient O-ring 92 for establishing sealing engagement between the piston 84 and the cylinder 94, in which the piston reciprocates. The cylinder 84 is slighty inclined so that the axis thereof is substantially parallel with the cam surface 88. A fluid passage 96, which is formed in the power head 52, is communicated at one extremity thereof with the cylinder 94 and is provided at the other end thereof with an external fitting 98. A conduit 100, connected at one extremity thereof to the fitting 98, is communicated through the manifold M to the source S of pressurized fluid and is controlled by a valve 102, of the three-way type described above, to communicate fluid under pressure to the cylinder 94 to actuate the piston 84. Application of fluid under pressure to the cylinder 84 by opening the valve 102, therefore, will cause the pushing block 80 to move longitudinally and laterally with respect to the flow passage of the valve.

A holding dog 104 is retained by a bolt 105 within a recess 106 in the power head 52 and is provided with a series of transverse teeth 108, which engage the flow passage wall 16–18 of the valve, to prevent movement of the power head 52 relative to the flow passage. The pushing block 80 is provided with a pushing dog 110 which is retained by a bolt 111 within a recess 112 in the pushing block 80, and is formed with a series of transverse teeth 114 which oppose the holding dog teeth 108, and which engage the inner periphery of the seat member 28 to prevent relative movement between the seat member and the pushing block. The teeth 108 and 114 are formed with a curvature substantially equal to the curvature of the flow passage of the smallest valve for which the machine is designed. The pushing block 80 therefor will be moved axially of the flow passage 16 under influence provided by the piston 84 to force the valve seat 28 from its seat recess 30, as illustrated in broken lines in FIGURE 3.

As illustrated in FIGURES 1 and 4, the seat extraction machine 50 is provided at each side thereof with a tension spring 120 which is fitted within a channel 122 formed in the power head 52 and pushing block 80. Each of the tension springs 120 is connected between a post 124 in the power head 52 and a post 126 on the pushing block 80. The spring 120 serves to prevent the pushing block 80 from being blown completely free of the power head 52 when the seat ring which is being extracted breaks loose from its seat. For example, the fluid pressure applied to the piston 84 in order to move the seat from the seat recess may reach or exceed 10,000 p.s.i. before the press-fit of the seat is broken. The seat may be suddenly ejected from its recess by the pushing block 80 when the press-fit is broken. The momentum of the pushing block is effectively absorbed by the tension springs 120 causing the pushing block 80 to remain in assembly with the power head 52. After the pushing block 80 has been extended by the piston 84 to force the seat 28 from its recess, the valve 102 is moved to its dump position, allowing venting of fluid in the cylinder 94 either to the atmosphere or to the fluid reservoir R as desired. The tension spring will then return the pushing block 80 to its normal unextended position, thereby moving the piston 84 into the cylinder 94 and expelling fluid from the cylinder 94.

In operation the seat extracting machine is placed within the flow passage 16 or 18 of the valve 12 by the operator in such a manner that the teeth 114 of the pushing dog 110 rest on the seat member 28 while the holding dog teeth 108 engage the flow passage. The valve 68 is then actuated to its open position to allow fluid to flow from the pressurized source through the manifold M, line 68, and fluid passage 62 into the cylinder 54, thus causing the piston 56 to be moved outwardly of the power head 52 and to force the serrated surface 76 of the replaceable locking bar 70 into tight engagement with the wall 16–18 of the flow passage and causing the teeth 108 of the holding dog 104 to be forced slightly into the surface 16 of the flow passage. The valve 68 is then moved to its closed position to trap the pressurized fluid within the cylinder 54 to retain the power head in locked position within the flow passage. With the valve locking structure energized, the valve 102 is actuated to its open position by the operator to allow the flow of pressurized fluid from the manifold M to the fluid source S, through the conduit 100 and flow passage 96, to the cylinder 94, to thereby cause actuation of the piston 84 to force the pushing block 80 in a direction generally axially of the flow passage 16. Due to the cooperation between the cam surfaces 86 and 88 respectively on the power head 52 and the pushing block 80, outward movement of the pushing block 80 will cause the teeth 114 of the pushing dog 110 to not only be moved outwardly but also to be moved downwardly such that an extremely tight engagement between the teeth 114 of the pushing dog 110 and the valve seat 28 occurs. This will cause the teeth 114 to dig slightly into the inner periphery of the seat to prevent slipping between the pushing dog and the seat. Further movement of the pushing block will cause the seat to be forced from its seat recess. It has been found that an inclination of the cam surfaces 86 and 88 of approximately 3° from the horizontal will provide sufficient transverse movement of the pushing dog 110 to prevent slipping of the teeth 114 on the inner peripheral surface of the valve seat.

During the application of fluid pressure against the piston 84 prior to movement of the seat ring from its recess, the force applied to the seat ring by the pushing block 80 will cause the power head to be rotated slightly about the holding dog 104, as illustrated in broken lines in FIGURE 3. As the power head is rotated, slipping or binding between the bar 70 and the piston 56 is effectively prevented by the universal connection between the piston and bar as described above. The resilient material 69, in which the bolt 67 is embedded, will allow slight angular movement between the bar and the piston thereby allowing the power head to pivot slightly during the seat removal stroke of the pushing block 80 while the surface 76 on the bar 70 is allowed to remain in tight engagement with the flow passage 16–18. The angle of force applied to the seat by the pushing dog 80 will be effectively reduced equivalent to the degree of rotation of the power head 52. Assuming that the angle of the cam surface 88 is 3° from a horizontal defined by the flow passage 16 and the counterclockwise rotation of the power head 52 amounts to 2°, the resultant angle of force applied to the seat ring by the pushing block will be 1°. It has been found that the seat ring will not be caused to bind excessively due to the low resultant angle of the force applied to the seat ring by the pushing block. The specific 3° angle of inclination of the cam surfaces is given as merely illustrative and not in a limiting sense in regard to this invention.

From the foregoing, it is seen that I have produced a machine for extracting press-fitted seats from the seat recesses which quickly and easily breaks even the tightest press-fit. The machine is light in construction and may be transported to the repair site easily. The machine can be placed within the flow passage quickly and easily by a single operator and may be actuated from a position remote to the valve by a single operator to remove press-fitted seats. The invention, since it is easily and quickly placed in the valve passage and since it may be operated from a remote position, obviates any need for the operator to be subjected to fumes from the lading or to be subjected to the danger of explosion in the valve body for extended lengths of time. The machine is easily adapted for use with different size valves merely by connecting a locking bar of the desired length to the bolt 67 of the locking piston 56. The invention, therefore, is one well adapted to attain all of the objects hereinabove set forth together with other advantages which are obvious and inherent from a description of the apparatus itself.

It will be understood that certain features and subcombinations are of utility and may be employed without reference to other features and subcombinations. This is contemplated by and is within the scope of the appended claims.

As many possible embodiments may be made of the invention without departing from the scope thereof, it is to be understood that all matter herein set forth or shown in the accompanying drawings is to be interpreted as illustrative and not in a limiting sense.

I claim:

1. A machine for extracting press-fitted seats from the seat recesses of a valve having flow passages, the machine comprising a power head, a first fluid motor positioned within the power head and having means engaging the wall of said valve bore upon actuation of said first motor means to lock the power head within the flow passage of the valve, means for actuating the first fluid motor, a pushing block fitted to the power head, a second fluid motor disposed within the power head and extending the pushing block relative to the power head upon actuation of said second motor means, means for actuating the second fluid motor, means for locking the pushing block to the valve seat, means for returning the pushing block to its unextended position upon deenergization of the second fluid motor.

2. A machine for extracting press-fitted seats from the seat recesses of a valve having flow passages, the machine comprising a power head, a first reciprocating fluid motor positioned within the power head, a replaceable bar carried by the first fluid motor and being moved by said first fluid motor into tight engagement with the flow passage upon actuation of said motor to lock the power head within the flow passage of the valve, a source of pressurized fluid, a conduit connecting said source and first fluid motor and having a valve disposed therein for selectively controlling actuation of the first fluid motor, a pushing block fitted to the power head, a second reciprocating fluid motor disposed within the power head and having a piston thereof connected to said pushing block, said piston upon actuation of said second fluid motor extending the pushing block relative to the power head, a conduit interconnecting the second fluid motor and said source and having a valve disposed therein for selectively controlling actuation of the second fluid motor, means carried by said pushing block for engaging said valve seat at one side thereof and locking the pushing block to the valve seat, means for returning the pushing block to its unextended position upon deenergization of the second fluid motor.

3. A machine for extracting press-fitted seats from the seat recesses of a valve having flow passages, the machine comprising a power head, a first reciprocating fluid motor disposed within the power head, a replaceable bar carried by the first fluid motor and being movable by said fluid motor into tight engagement with the flow passage upon actuation of said motor to lock the power head within the flow passage of the valve, a source of pressurized fluid, a conduit interconnecting said source and first fluid motor and having a valve disposed therein for selectively controlling actuation of the first fluid motor, a pushing block fitted to the power head, a second reciprocating fluid motor disposed within the power head and having a piston thereof carried by said pushing block, said piston, when said second fluid motor is actuated extending the pushing block relative to the power head, a conduit interconnecting the second fluid motor and said source and having a valve disposed therein for selectively controlling the flow of fluid to the second fluid motor, a pushing dog having a series of teeth formed thereon positioned on the pushing block and tightly engaging the valve seat at one side thereof upon actuation of said second fluid motor, means for returning the pushing block to its unextended position upon deenergization of the second fluid motor.

4. A machine for extracting press-fitted seats from the seat recesses of a valve having flow passages, the machine comprising a power head, a first reciprocating fluid motor disposed within the power head, a replaceable bar carried by the first fluid motor and being movable by said motor into tight engagement with the flow passage upon actuation of said motor to lock the power head within the flow passage of the valve, a source of pressurized fluid, a conduit interconnecting said source and first fluid motor and having a valve disposed therein for selectively controlling actuation of the first fluid motor, a pushing block fitted to the power head, a second reciprocating fluid motor disposed within the power head and having a piston thereof carried by said pushing block, said piston extending the pushing block relative to the power head upon actuation of said second fluid motor, a conduit interconnecting the second fluid motor and said source and having a valve disposed therein for selectively controlling the flow of fluid to the second fluid motor, a pushing dog having a series of teeth formed thereon positioned on the pushing block and tightly engaging the valve seat at one side thereof upon actuation of said second fluid motor, at least one tension spring interconnecting the power head and the pushing block and adapted for returning the pushing block to its unextended position upon deenergization of the second fluid motor.

5. A machine for extracting press-fitted seats from the seat recesses of a valve having flow passages, the machine comprising a power head, a first fluid motor positioned within the power head and having a locking bar connected thereto, said motor upon being energized moving the locking bar into engagement with the wall of one of said flow passages to lock the power head within the flow passage of the valve, means for actuating the first fluid motor, a pushing block fitted to the power head, a second fluid motor disposed within the power head and having a piston thereof carried by said pushing block, said piston extending the pushing block relative to the power head upon actuation of said motor, means for actuating the second fluid motor, cooperating cam surfaces formed on the power head and pushing block and adapted to cause transverse movement of the pushing block relative to the power head as said pushing block is being extended, a plurality of transverse teeth on the pushing block for engagement with said press-fitted seat at one side thereof for locking the pushing block to the valve seat, means for returning the pushing block to its unextended position upon deenergization of the second fluid motor.

6. A machine for extracting press-fitted seats from the seat recesses of a valve having flow passages, the machine comprising a power head, a first motor within the power head having a bolt and adapted to move the bolt in a direction substantially normal to the flow passage, a flexible coupling between the first motor and the bolt, an interchangeable locking bar received by the bolt and adapted upon energization of the first motor to engage the flow passage wall to lock the power head within the flow passage, a pushing block fitted to the power head, a second motor in the power head and adapted to extend the pushing block relative to the power head upon energization thereof, a holding dog on the power head for engaging the flow passage wall to prevent movement of the power head relative to the flow passage, a pushing dog on the pushing block for engaging the seat to prevent movement of the pushing block relative to the seat, spring means having one end thereof connected to the power head and the other end thereof connected to the pushing block for returning the pushing block to its unextended position upon deenergization of the second motor, means for selectively energizing and deenergizing each of said motors.

7. A machine for extracting press-fitted seats from the seat recesses of a valve having flow passages, the machine comprising a power head, a first motor within the power head having an externally threaded bolt and adapted to move the bolt in a direction substantially normal to the flow passage, a flexible coupling between the motor and the bolt, an interchangeable locking bar having a threaded bore therein threadedly received by the bolt and adapted upon energization of the first motor to engage the flow passage wall to lock the power head within the flow passage, said bar having a serrated surface for intimate contact with the passage to prevent slipping between the bar and the passage, a pushing block fitted to the power head, a second motor in the power head and adapted to extend the pushing block relative to the power head upon energization thereof, a pair of cooperating cam surfaces on the power head and pushing block adapted to induce transverse movement to the pushing block as the pushing block is extended, a holding dog on the power head having a plurality of teeth for engaging the flow passage wall to prevent movement of the power head relative to the flow passage, a pushing dog on the pushing block having a plurality of teeth opposing the holding dog teeth for engaging the seat to prevent movement of the pushing block relative to the seat, spring means having one end thereof fixed to the power head and the other end thereof connected to the pushing block for returning the pushing block to its unextended position upon deenergization of the second motor, means for selectively energizing each of the motors.

8. A machine for extracting press-fitted seats from the seat recesses of a valve having flow passages, the machine comprising a power head, a first fluid motor within the power head having an externally threaded bolt adapted to move the bolt in a direction substantially normal to the flow passage, a flexible coupling between the fluid motor and the bolt, an interchangeable locking bar having a threaded bore therein threadedly received by the bolt and adapted upon energization of the first fluid motor to engage the flow passage wall to lock the power head within the flow passage, said bar having a serrated surface thereon for intimate contact with the flow passage to prevent slipping between the bar and the flow passage, a pushing block fitted to the power head, a second fluid motor in the power head and adapted to extend the pushing block relative to the power head upon energization thereof, a pair of cooperating cam surfaces on the power head and pushing block adapted to induce transverse movement to the pushing block upon extension of the pushing block, a holding dog on the power head, having a plurality of teeth for engaging the flow passage wall to prevent movement of the power head relative to the flow passage, a pushing dog on the pushing block having a plurality of teeth opposing the holding dog teeth for engaging the seat to prevent movement of the pushing block relative to the seat, spring means having one end thereof fixed to the power head and the other end thereof connected to the pushing block for returning the pushing block to its unextended position upon deenergization of the second fluid motor, a source of pressurized fluid, a fluid manifold in communication with the source, a valve controlled conduit one for each of the fluid motors being in communication with the manifold for selectively conducting the flow of pressurized fluid from the source to the fluid motors.

9. A machine for extracting press-fitted seats from the seat recesses of a valve having flow passages, said machine having a power head, a first fluid motor including a cylinder formed in the power head, means connecting the inner extremity of the cylinder with a source of selectively controlled pressurized fluid, a piston disposed within the cylinder, said piston having a chamber formed therein, a bolt disposed within the chamber and having one end extending outwardly of the piston, resilient material disposed within the chamber and encasing said bolt to retain the bolt in spaced relation with the walls defining the chamber, said one end of the bolt being formed with external threads, a replaceable bar having internal threads in one end thereof threadedly connected to said one end of said bolt, said resilient material allowing angular movement of said bar relative to said piston, said piston and bar adapted for extension relative to said power head upon the pressurization of said cylinder with said pressurized fluid to lock the power head within the flow passage of the valve, a pushing block fitted to the power head and contacting said press-fitted seat, a second fluid motor disposed within the power head and adapted to extend the pushing block relative to the power head to extract said seat, means for actuating the second fluid motor.

References Cited by the Examiner

UNITED STATES PATENTS

| | | | |
|---|---|---|---|
| 1,506,948 | 9/1924 | Siegerist | 29—282 X |
| 1,871,963 | 8/1932 | Dill | 287—85 |
| 2,950,525 | 8/1960 | Duncan et al. | 29—282 X |

WILLIAM FELDMAN, *Primary Examiner.*

J. C. PETERS, *Assistant Examiner.*